US008068783B2

(12) United States Patent
Braithwaite et al.

(10) Patent No.: US 8,068,783 B2
(45) Date of Patent: Nov. 29, 2011

(54) ADAPTIVE ECHO CANCELLATION FOR AN ON-FREQUENCY RF REPEATER USING A WEIGHTED POWER SPECTRUM

(75) Inventors: Richard Neil Braithwaite, Orange, CA (US); Scott Carichner, Rancho Santa Margarita, CA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 881 days.

(21) Appl. No.: 12/009,667

(22) Filed: Jan. 22, 2008

(65) Prior Publication Data

US 2008/0176513 A1    Jul. 24, 2008

Related U.S. Application Data

(60) Provisional application No. 60/897,112, filed on Jan. 24, 2007.

(51) Int. Cl.
*H04B 3/23* (2006.01)
*H04B 7/14* (2006.01)
*H04B 3/36* (2006.01)

(52) U.S. Cl. ................... 455/24; 455/9; 455/15

(58) Field of Classification Search ............... None
See application file for complete search history.

(56) References Cited

U.S. PATENT DOCUMENTS

| 6,182,203 | B1* | 1/2001 | Simar et al. ............ 712/22 |
| 2002/0181699 | A1* | 12/2002 | Pham et al. .......... 379/406.08 |
| 2004/0001464 | A1 | 1/2004 | Adkins et al. |
| 2005/0215193 | A1 | 9/2005 | Kummetz |
| 2006/0014491 | A1 | 1/2006 | Cleveland |
| 2006/0040611 | A1 | 2/2006 | Ding et al. |
| 2006/0052066 | A1 | 3/2006 | Cleveland et al. |
| 2006/0240795 | A1 | 10/2006 | He |

OTHER PUBLICATIONS

Notification of Transmittal of the International Search Authority, International Search Report, and Written Opinion for International Application No. PCT/US08/00738 dated May 19, 2008, 10 pages.

* cited by examiner

*Primary Examiner* — Philip Sobutka
(74) *Attorney, Agent, or Firm* — OC Patent Law Group

(57) ABSTRACT

A wireless repeater includes an input antenna for receiving an input signal, an output antenna for outputting an amplified signal, and an amplifier for amplifying the received input signal and providing the output amplified signal to the output antenna. Radiated coupling between the input and output antennas causes echoes to be transmitted by the repeater. A filter is used for applying a weighting function to a power spectrum of a measured signal in the wireless repeater thereby obtaining a weighted power spectrum of the measured signal. An internal feedback path is employed for adaptively canceling the echo by implementing an adaptive algorithm based on a autocorrelation of the input signal employing the weighted power spectrum of the measured signal.

24 Claims, 8 Drawing Sheets

ADAPTIVE ECHO CANCELLATION FOR AN ON-FREQUENCY RF REPEATER USING A WEIGHTED POWER SPECTRUM

CROSS-REFERENCE TO RELATED APPLICATION

The present application claims priority under 35 USC section 119(e) to U.S. Provisional Patent Application Ser. No. 60/897,112, filed Jan. 24, 2007, the disclosure of which is herein incorporated by reference in its entirety.

BACKGROUND OF THE INVENTION

1. Field of the Invention

The present invention relates to radio frequency (RF) repeaters. More particularly, the present invention relates to adaptive echo cancellation system and method for an on-frequency RF repeater.

2. Description of the Prior Art and Related Information

In a wireless communication system, a mobile unit such as a cellular phone transmits and receives RF signals to and from cell site base stations. An on-frequency RF repeater receives, filters, and re-transmits the signal of interest at the same frequency and at a higher power level. If the product of the forward gain of the repeater and the coupling between antennas is too high, the repeater will oscillate. In general, this is undesirable. An internal feedback path may be used to compensate for the external coupling between antennas, allowing the forward gain of the repeater to be increased if required. This compensation is referred to as "echo cancellation."

Some residual echo after cancellation is acceptable. However, it is desirable to minimize such residual echo. This may be difficult in some applications, especially for large repeater gains, or for other repeater implementations having difficult cancellation conditions. Accordingly, a need exists for an improved system and method for echo cancellation.

SUMMARY OF THE INVENTION

In view of the foregoing, the following systems and methods provide improved echo cancellation for an RF repeater using a weighted power spectrum.

In one aspect, embodiments of the invention provide a wireless repeater, which includes an input antenna for receiving an input signal, an output antenna for outputting an amplified signal, an amplifier for amplifying the received input signal and providing the output amplified signal to the output antenna, a filter for applying a weighting function to a power spectrum of a measured signal in the wireless repeater thereby obtaining a weighted power spectrum of the measured signal, and an internal feedback path for adaptively canceling an echo between the output antenna and the input antenna by implementing an adaptive algorithm based on an autocorrelation of the input signal employing the weighted power spectrum of the measured signal, wherein the filter reduces the width of the autocorrelation of the input signal.

In one embodiment, the input signal and the output amplified signal have the same frequency. The internal feedback path may include a digital gain block, and the measured signal is measured before the digital gain block.

In one embodiment, the internal feedback path includes a portion of a digital IF stage. The digital IF stage may include a digital signal processor implementing the adaptive algorithm for cancelling the echo.

In one embodiment, the weighting function whitens a power spectrum of the input signal plus noise. The weighting function may preserve echo ripples in the power spectrum of the measured signal. The weighting function adjusts power of a carrier within the measured signal so that when multiple carriers are included, each carrier has on average the same power density, and when a single carrier is included, the power density of the single carrier is reduced to match an ambient noise of the repeater.

In another aspect, embodiments of the invention provide a method for echo cancellation in a wireless repeater. The method includes measuring a signal in a signal path of the wireless repeater, applying a spectral weighting function to a power spectrum of the measured signal to obtain a weighted power spectrum, obtaining an autocorrelation of the signal in the signal path of the repeater based on the weighted power spectrum, detecting an echo in the signal path based on the autocorrelation, and adaptively cancelling the echo in the signal path based on the detected echo, wherein the weighted power spectrum reduces the width of the autocorrelation.

In one embodiment, applying the spectral weighting function comprises filtering the measured signal. The signal in the signal path may be a narrowband signal having an overlapping autocorrelation between the echo and measured signal prior to applying the spectral weighting function. Such narrowband signals include, for example, an Enhanced Data rates for GSM Evolution (EDGE) signal.

In one embodiment, the method further includes obtaining the spectral weighting function based on an input spectrum without echo, and may further include estimating the input spectrum by fitting the power spectrum of the measured signal to a model based on the modulation format of the signal in the signal path. The power spectrum of the measured signal is quantized to a plurality of levels. Preferably quantizing the power spectrum includes logarithmic quantizing. The power spectrum is configured as a function of a plurality of frequency bins, and the method may further include grouping bins in the power spectrum to form bands wider than the frequency bins. The method may further include obtaining a mean power from the bands, and calculating the spectral weighting function using an inverse of the mean power.

In one embodiment, the spectral weighting function is based on an input signal and a noise signal spectra without effects of the echo.

The method may further include partitioning the power spectrum into disjoint bands by grouping frequency bins into contiguous bands based on a measured power density, and normalizing a power of each band so that a power spectral density of each band equals a reference level.

In another aspect, embodiments of the invention provide a wireless communication system, including a base station and an on-frequency repeater for extending the base station coverage. The on-frequency repeater includes an input antenna for receiving an input signal, an output antenna for outputting an amplified signal, an amplifier for amplifying the received input signal and providing the amplified output signal to the output antenna, and an internal feedback path for adaptively cancelling an echo between the input antenna and the output antenna. The internal feedback path includes means for measuring a signal in the feedback path, means for obtaining a weighted power spectrum of the measured signal, means for obtaining a signal autocorrelation in the feedback path based on the weighted power spectrum, and means for adaptively cancelling the echo based on the obtained signal autocorrelation.

In one embodiment, the means for obtaining the weighted power spectrum includes a filter for reducing the width of the signal autocorrelation. The means for obtaining the weighted power spectrum may whiten the power spectrum.

Further aspects of the construction and method of operation of the invention, with additional objects and advantages thereof, will be best understood from the following description of specific embodiments when read in connection with the accompanying drawings.

DETAILED DESCRIPTION OF THE INVENTION

The present invention will now be described, by way of example, for the best mode contemplated by the inventors for carrying out the present invention, in reference with the accompanying drawings. It shall be understood that the following description, together with numerous specific details, may not contain specific details that have been omitted as it shall be understood that numerous variations are possible and thus will be detracting from the full understanding of the present invention. It will be apparent, however, to those skilled in the art, that the present invention may be put into practice while utilizing various techniques.

Embodiments of the invention provide an adaptive echo cancellation system and method for an on-frequency RF repeater using a weighted power spectrum. The repeater preferably has a digital intermediate frequency (IF) stage, and internal digital echo cancellation is performed in a digital signal processor (DSP). A preferred technique is based on the autocorrelation of the repeater signal (input signal plus echoes). The gain of the repeater is adjusted outside of the internal digital feedback loop of the echo cancellation, such as within the RF stages at the output side of the repeater. The RF gain of the repeater is set low initially, then increased to a maximum gain, so that the echo cancellation can adapt incrementally and maintain stability throughout.

The autocorrelation detects echoes reliably when the width of the autocorrelation of the input signal is less than the loop delay of the echo path. Narrow bandwidth signals such as Enhanced Data rates for GSM Evolution (EDGE) can cause problems because the autocorrelations of the input signal and echo overlap. However, in the approach in accordance with embodiments of the invention as discussed in detail below, the repeater signal is filtered to reduce the width of the autocorrelation. The filter is designed to adjust the power of all carriers within the input signal so that each carrier has the same power density (on average) without affecting the ripples within the power spectrum that are needed to detect the echoes. When only one carrier is available, its power density is reduced to match the ambient noise of the repeater. The filtering is applied in the frequency domain to the power spectrum. This weighted power spectrum is Fourier transformed to produce a more favorable autocorrelation. Applying the filter to the power spectrum directly simplifies the computation of the optimum filter. The power spectrum is partitioned into disjoint bands by grouping frequency bins into a contiguous bands based on the measured power density. Each contiguous band approximates a carrier bandwidth or the guard region separating carriers. The power of each band is normalized so that the power spectral density equals a reference level.

Figure 1:
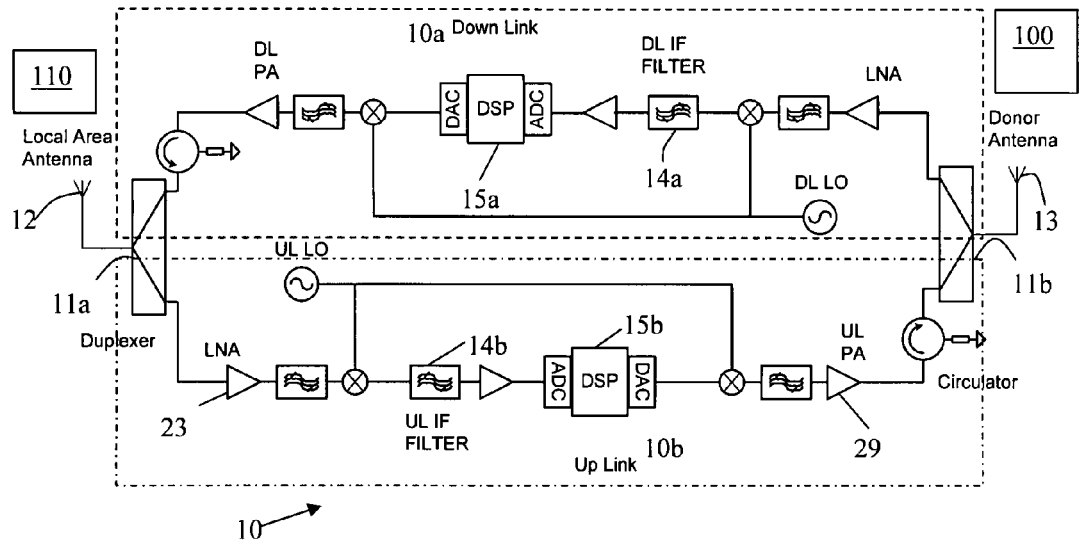
FIG. 1 is block diagram of a bidirectional on-frequency repeater with a digital intermediate frequency (IF) stage.
Figure 2:
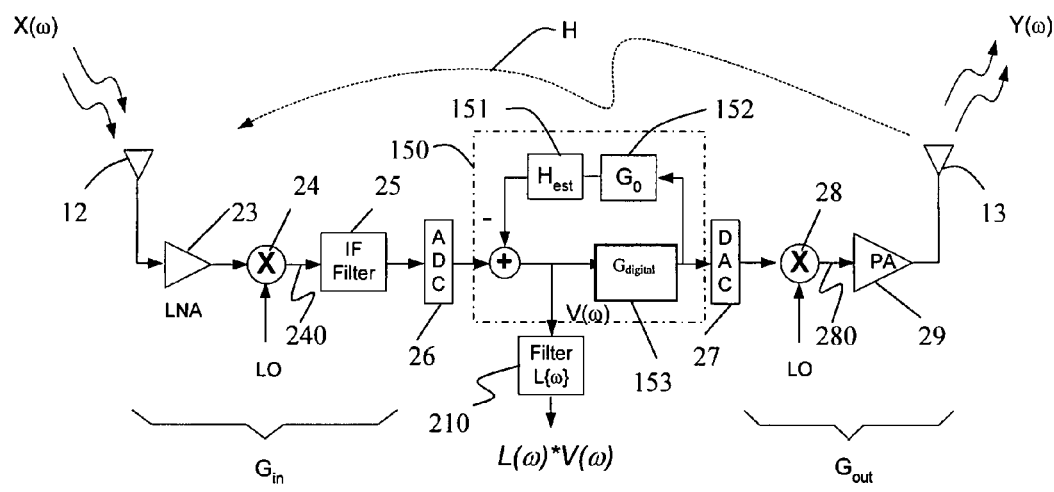
FIG. 2 is a block schematic drawing of one of the paths of the repeater including the RF coupling between the input and output antennas.

An on-frequency repeater in accordance with embodiments of the invention is shown in FIGS. 1 and 2. FIG. 1 shows the block diagram of an on-frequency repeater 10 with a digital IF stage employing improved echo cancellation in accordance with a preferred embodiment of the invention. The repeater 10 is bidirectional, and may use a frequency division duplex (FDD) implementation to separate the up- and down-link paths 10a and 10b connecting the base station 100 and mobile user 110. The down-link 10a connects the base station 100 to the mobile 110, and the up-link 10b connects the mobile 110 to the base station 100.

The up- and down-link paths 10a, 10b perform substantially the same functions and may use the same components. Bandpass filtering is performed at an intermediate frequency (IF) using filters 14a and 14b. Compensation for the antenna coupling is performed in internal feedback paths within the up- and down-link paths 10a and 10b. The internal feedback paths may include feedback compensation units within the digital IF stages comprising digital signal processors (DSP) 15a and 15b.

The key components of each path, shown in an exemplary path in FIG. 2 with reference also to components in FIG. 1, include the input (local area) antenna 12 (closest to the mobile 110), low noise amplifier (LNA) 23, down-converting mixer 24, IF filter 25, analog-to-digital converter (ADC) 26, digital signal processor (DSP) 15a or 15b (FIG. 1), digital-to-analog converter (DAC) 27, up-converting mixer 28, power amplifier (PA) 29, and output (donor) antenna 13. As known to those skilled in the art, additional components may be included in the repeater 10. For example, first and second image reject filters may be included and located, e.g., between the LNA 23 and the down-converting mixer 24, and between the up-converting mixer 28 and the power amplifier 29, respectively. A first duplexer 11a may be provided between the antenna 12 and LNA 23. A circulator and a second duplexer 11b may be located, for example, between the PA 29 and the output antenna 13. Additional gain stages maybe present at various locations within the RF path 280 or the IF path 240 (FIG. 2).

The block diagram shown in FIG. 2 provides more details of the feedback paths within the individual links, 10a or 10b. It also shows the RF coupling H between the input antenna 12 and the output antenna 13. In accordance with a preferred embodiment of the invention, the echo cancellation is implemented using feedback compensation in a DSP (as shown in FIG. 1). Other embodiments are possible where the DSP-based compensation is converted to analog, and possibly up-converted in frequency, then coupled to the IF or RF path. For convenience, not all of the components found typically in a repeater are shown, such as the image reject filters, circulators, and duplexers.

The input signal, e.g., the in-coming signal without the effects of feedback, is denoted by x(t). It's Fourier transform is denoted by $X(\omega)$. The output signal and it's Fourier transform are denoted by y(t) and $Y(\omega)$, respectively. Within FIG. 2, the forward gain of the repeater 10 is represented as the product of the three gain blocks: an input gain $G_{in}$, a digital gain $G_{digital}$, and an output gain $G_{out}$. For notational convenience, the analog gains are combined and denoted by $G_0 = G_{in} G_{out}$. In FIG. 2, the product of the estimate feedback coupling block 151, the estimate of analog forward gain $G_0$ block 152, and the digital gain block 153, are generally referred to as the feedback path or feedback loop 150.

The input signal $X(\omega)$, although used in the following for modeling, usually cannot be directly measured because it is difficult to separate $X(\omega)$ from the output signal $Y(\omega)$ through the coupling path H. What can be measured usually is a signal v(t) within a signal path of the repeater, measured prior to the digital gain $G_{digital}$ block 153. The signal v(t), whose Fourier transform is denoted by $V(\omega)$, is a measurement made prior to the digital gain $G_{digital}$ block 153. The external feedback coupling is modeled as $$H(\omega) = \sum_{n=1}^{N} a_n \cdot \exp\{j \cdot \omega \cdot T_n\} \quad \text{(Eq. 1)}$$

where $a_n$ are complex coefficients and $T_n$ are loop delays. The estimate of the feedback coupling has the same form:

$$H_{est}(\omega) = \sum_{n=1}^{N} b_n \cdot \exp\{j \cdot \omega \cdot T_n\} \quad \text{(Eq. 2)}$$

where $b_n$ are complex coefficients.

In the following analysis, the IF filter 25 shown in FIG. 2 is modeled as a delay element within the repeater. This approximation assumes that the passband of the IF filter 25 is flat and that its bandwidth is wider than the spectrum of the input signal of interest. If this assumption is not valid, the estimated feedback coupling, $H_{est}$, will be the product of the actual coupling, H, and the frequency response of the filter. This does not affect the approach to echo compensation; however, changes in the frequency response or gain of the filter will require re-estimation of the coefficients modeling the product of the feedback coupling and IF filter.

The transfer function of the repeater, using the measurement signal v(t), is $$V(\omega) = \frac{G_{in}}{1 - G_0 \cdot G_{digital} \cdot [H(\omega) - H_{est}(\omega)]} \cdot X(\omega). \quad \text{(Eq. 3)}$$

where $G_0 = G_{in} G_{out}$. The input signal $X(\omega)$ is usually not available for measurement because the input antenna 12 sums both $X(\omega)$ and the coupled signal from the output antenna 13, (H*Y). Statistical properties of the measured signal, v(t), may be used to estimate the feedback coupling. The power spectrum of v(t) is used in the estimation and subsequent iterative search for the optimum feedback cancellation coefficients, $b_n$.

The power spectrum of the measured signal, $S_v(\omega)$, written as a function of the input power spectrum, $S_x(\omega)$, is $$S_v(\omega) = \left| \frac{G_{in}}{1 - G_0 \cdot G_{digital} \cdot [H(\omega) - H_{est}(\omega)]} \right|^2 \cdot S_x(\omega). \quad \text{(Eq. 4)}$$

The autocorrelation of v(t) is denoted by $\rho_v(\tau)$, and can be computed from the power spectral density, (Eq. 4). The autocorrelation for a loop delay $T_n$ is $$\rho_v(T_n) = \sum_{k=0}^{M-1} S_v(\omega_k) \cdot \exp\{j \cdot k \Delta \omega \cdot T_n\} \quad \text{(Eq. 5)}$$

where M is the number of frequency bins in the power spectrum. If the input signal can be described as an a-dependent process, then the input signal (without echo) is uncorrelated to itself for delays greater than $T_a$. The echo caused by the feedback appears in the autocorrelation at multiples of the loop delay, $T_n$. When the minimum loop delay, $T_{min}$, is greater than $T_a$, the portion of the autocorrelation associated with the input signal and echo can be separated. In such cases, the autocorrelation is used to refine the feedback coefficient estimates associated with the dominant loop delays. For a repeater with a digital IF stage, it is easy to ensure that the minimum loop delay exceeds $T_a$, although excessively large delays (>10 μs) are discouraged for cellular systems.

Consider the time domain representation of the repeater signal:

$$v(t) = x(t) + \epsilon(t) \quad \text{(Eq. 6)}$$

where x(t) and $\epsilon(t)$ are the input and residual echo signals, respectively, in the time domain. The residual echo is $$\varepsilon(t) = \sum_{n=1}^{N} (a_n - b_n) \cdot v(t - T_n) \quad \text{(Eq. 7)}$$

which makes (Eq. 6) recursive. Assume that the autocorrelation of the input signal, denoted by $E[x(t+\tau)x^*(t)]$ where $E[\;]$ indicates expected value, is zero for $\tau > T_{min}$, the autocorrelation of the repeater signal for $\tau < T_{min}$ is $$\rho_v(0 < \tau < T_{min}) = E[x(t+\tau)x^*(t)] + E[\epsilon(t+\tau)\epsilon^*(t)] \approx E[x(t+\tau)x^*(t)]. \quad \text{(Eq. 8)}$$

The approximation assumes that the residual echo, $\epsilon(t)$, is much lower in power than the desired input signal, x(t). When the approximation is valid, (Eq. 8) is an estimate of the autocorrelation of the input signal. For $\tau > T_{min}$, we have $$\rho_v(\tau > T_{min}) = E[x(t+\tau)\epsilon^*(t)] + E[\epsilon(t+\tau)\epsilon^*(t)] \approx E[x(t+\tau)\epsilon^*(t)]. \quad \text{(Eq. 9)}$$

When $E[\epsilon(t+\tau)\epsilon^*(t)]$ is small, (Eq. 9) is an estimate of the cross-correlation between the input and residual echo signals. Note that $E[\epsilon(t+\tau)\epsilon^*(t)]$ can cause an unwanted offset in (Eq. 9) when it is larger than $E[x(t+\tau)\epsilon^*(t)]$; however, this is unlikely to occur except when the residual echo magnitude is large and at time delays that are multiples of echo loop delays $T_n$ (that is, when $\tau > 2\, T_{min}$).

The echo cancellation coefficients, $b_n$, are adjusted in an iterative manner to reduce the residual coupling, $H(\omega) - H_{est}(\omega)$. The error in the feedback coefficient is estimated using $$\begin{bmatrix} \rho_v(T_1) \\ \vdots \\ \rho_v(T_n) \end{bmatrix} = G_0 \cdot Q_{\Delta T} \cdot \begin{bmatrix} \Delta b_1^* \\ \vdots \\ \Delta b_n^* \end{bmatrix} \quad \text{(Eq. 10)}$$

where $$Q_{\Delta T} = \begin{bmatrix} \rho_{v0}(0) & \rho_{v0}(T_1 - T_2) & \cdots & \rho_{v0}(T_1 - T_n) \\ \rho_{v0}(T_2 - T_1) & \rho_{v0}(0) & \cdots & \rho_{v0}(T_2 - T_n) \\ \vdots & \vdots & \ddots & \vdots \\ \rho_{v0}(T_n - T_1) & \rho_{v0}(T_n - T_2) & \cdots & \rho_{v0}(0) \end{bmatrix} \quad \text{(Eq. 11)}$$

and $$\rho_{v0}(\Delta T) = \begin{cases} \rho_v(\Delta T) & \text{when } |\Delta T < T_a| \\ 0 & \text{otherwise.} \end{cases} \quad \text{(Eq. 12)}$$

The estimate of the residual coefficients is the least mean square (LMS) solution of (Eq. 10). It can be seen from (Eq. 8) and (Eq. 9) that the elements of the vector $[\rho_v(T_1) \ldots \rho_v(T_n)]^T$ and matrix $Q_{\Delta T}$ are the cross-correlation of the input and echo signals, and the autocorrelation of the input signal, respectively.

The update of the coefficient $b_n$ is $$b_n(t_{i+1}) = b_n(t_i) + \gamma \cdot \Delta b_n \quad \text{(Eq. 13)}$$

where $\gamma$ is a convergence constant. The process is considered converged where the maximum correlation magnitude beyond the minimum loop delay is 0.032 (−15 dB below the average power). An echo of −15 dB creates a ripple in the power spectrum of about 3 dB.

The autocorrelation of the input signal does not have to be zero for all delays greater than the minimum loop delay. However, a necessary condition is that the autocorrelation beyond $T_{min}$ is less than −15 dB, although some additional margin is preferred. Unfortunately, some cellular signals exist, such as an EDGE carrier, where the autocorrelation declines slowly and is still greater than −15 dB after a time delay of 10 μsec. In such cases, the autocorrelation method for refining the echo coefficients, (Eq. 10), will fail to converge to the desired values. This is due to the fact that the autocorrelation of the input masks the cross-correlation with the residual echo, and because the matrix $Q_{\Delta T}$ in (Eq. 11) becomes ill-conditioned.

It is possible to filter the repeater signal, $V(\omega)$, so that the autocorrelation is more compact, thereby allowing the use of the correlation method, (Eq. 10). As shown in FIG. 2, a filter 210 is applied to the measurement $V(\omega)$ only, and the output from the filter 210 is $L(\omega) * V(\omega)$. Thus, the filter 210 does not alter the forward path of the repeater or the echo cancellation signal. Since the filter 210 affects the input signal and the echo in the same manner, it does not change the estimation of the feedback coefficients.

The goal of filtering the measurement is to "whiten" the spectrum of the input signal plus noise. In the ideal case, $Q_{\Delta T}$ of (Eq. 11) will become equal to the identity matrix. Selecting the filter to achieve this would be challenging if it were applied to the signal directly; however, it is possible to modify the power spectrum used to compute the autocorrelation. Thus, the filter 210 shown in FIG. 2 should be understood generally as a block for applying a weighting function $L(\omega)$ to the measured power spectrum $V(\omega)$, thereby producing a weighted power spectrum, $L(\omega) * V(\omega)$. Let the spectra of the input signal and noise be denoted by $S_x(\omega)$ and $N(\omega)$, respectively, the spectral whitening function is $$|L(\omega)|^2 = \frac{1}{S_x(\omega) + N(\omega)}. \quad \text{(Eq. 14)}$$

Thus, the weighted power spectrum, denoted by $S_{LV}(\omega)$, becomes $$S_{LV}(\omega) = |L(\omega)|^2 \cdot S_V(\omega). \quad \text{(Eq. 15)}$$

As can be seen from (Eq. 14), the whitening function must be limited to frequency bands with discernible signal and/or noise power.

When creating the whitening function from measurements, it is preferably to base it on the input and noise spectra only, and not the effects of the echo. The input spectrum can be approximated in several ways:
1. The input spectrum can be measured by turning off the output stage of the repeater to eliminate the echo. This should be used sparingly because it interrupts the operation of the repeater.
2. The input spectrum can used be estimated by integrating the power spectrum over several intervals of time. Adjusting the phase of the forward gain over the integration period would make the estimate more reliable; however, the phase modulation would interfere with the repeater operation.
3. A model, based on knowledge of the modulation format of the input signal, can be fit to measurements of the spectrum (including the echo) to create the appropriate whitening function.

The third approach, fitting the measured spectrum $S_V(\omega)$ to a model, is used within the following preferred approach. The model assumes that the input signal comprises white noise plus multiple carrier signals, each of which has a flat power spectral density over the carrier bandwidth. Each carrier may have different power levels. The thermal noise from the front end of the repeater's receiver chain (LNA, for example), once amplified, is also treated as part of the input signal. When using the repeater signal $V(\omega)$ as a measurement, the spectrum will have ripples that are due to the residual echo. In accordance with a preferred embodiment of the invention, the filter preserves these ripples. The input signal may also have spectral variations due to multi-path fading before reaching the input antenna. The filter may alter multi-path ripples without affecting the results or the overall performance of the repeater.

Knowledge of the minimum loop delay is used in the construction of a spectral weighting function, $|L(\omega)|^2$, that preserves echo ripples. On average, the spacing between echo ripple peaks must be less than $1/T_{min}$, where $T_{min}$ is the minimum loop delay. As a result, an individual carrier bandwidth is useful for computing echo cancellation coefficients only when its bandwidth exceeds $1/T_{min}$. The model for the filter is a set of disjoint bands each wider than $1/T_{min}$ with transitions between bands.

In the first step for creating the spectral weighting function $|L(\omega)|^2$, the measurement $|V(\omega)|^2$, is quantized in magnitude to create a finite number of levels, which become classes.

Figure 3:
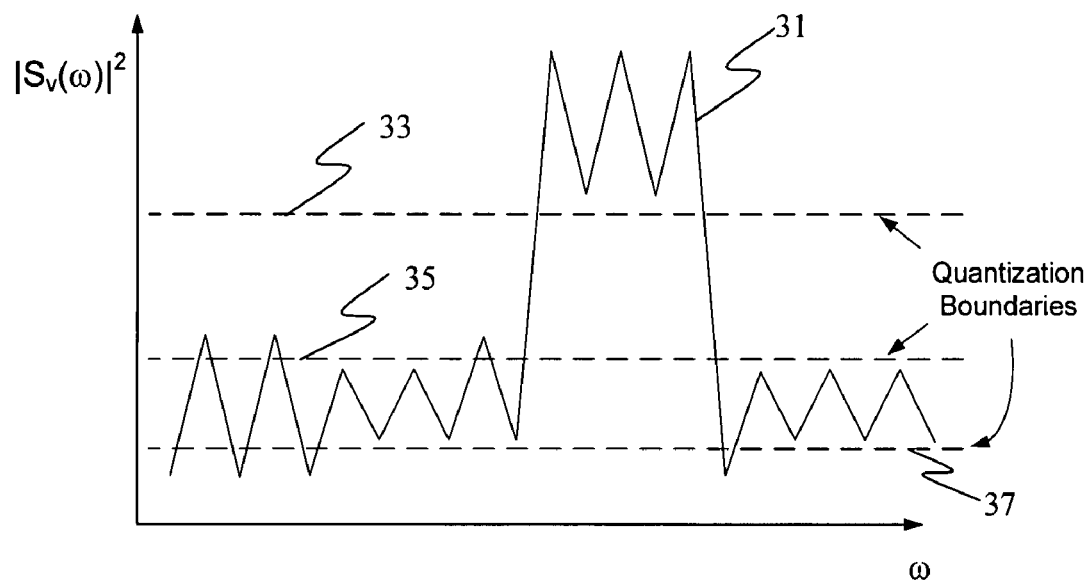
FIG. 3 is a plot illustrating quantization of power spectrum.

More specifically as shown in FIG. 3, the power spectrum $|S_r(\omega)|^2$, plotted as a trace 31, is quantized to a plurality of levels as indicated by a plurality of quantization boundaries 33, 35, 37. The quantization is logarithmic where each lower class boundary is defined as $$r_{k-1} = \alpha \cdot r_k \quad \text{(Eq. 16)}$$

where $0<\alpha<1$. The value of $\alpha$ is selected so that the width of each class, $r_k - r_{k-1}$, is on the same order as the expected echo ripple. The peak-to-peak ripple of the spectrum due to a −15 dB echo is 3 dB. In general, the peak-to-peak ripple will be larger.

Figure 4:
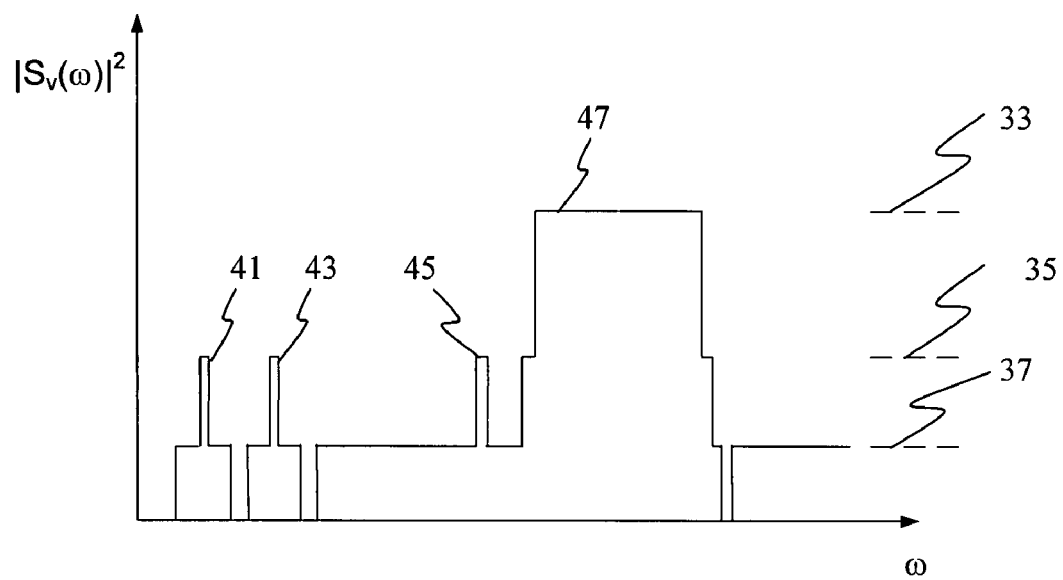
FIG. 4 is a plot illustrating initial class assignment to each bin in the power spectrum after quantization.

The quantization assigns a class to each bin, as shown in FIG. 4. For example, bins 41, 43, 45 are assigned with a class indicated by the quantization level 35, and bins 47 are assigned with a class indicated by the quantization level 33. Neighboring bins possessing a common class form bands. In general, these bands are fragmented into bandwidths smaller than the carrier because the echo ripple often causes the carrier spectrum to straddle two or more neighboring classes. To form larger bands, two grouping processes are applied that can be viewed as localized peak detection within the spectral domain.

Figure 5:
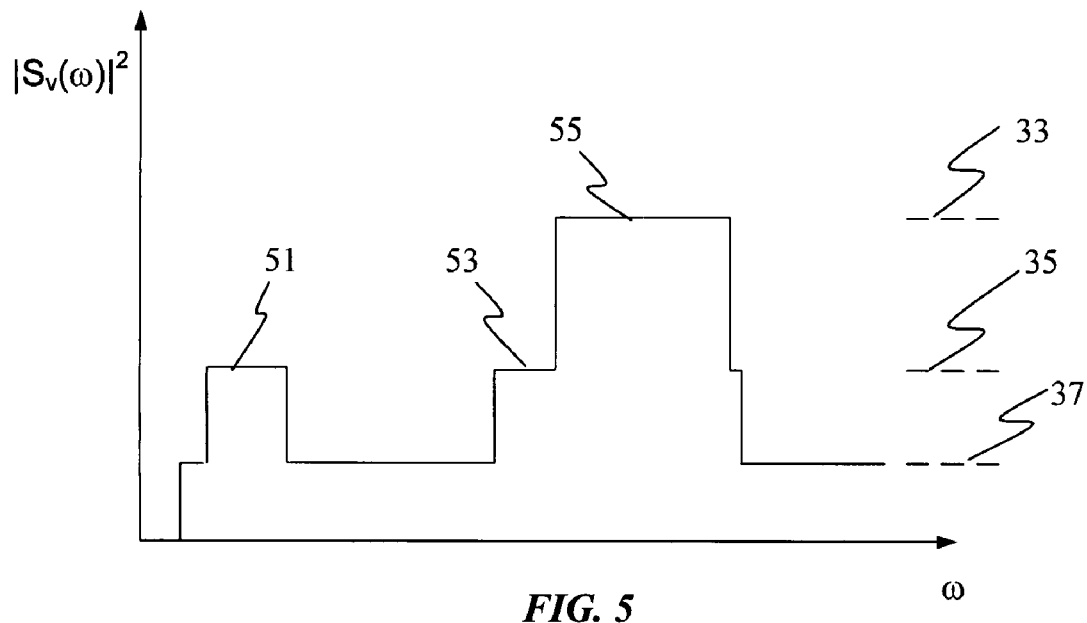
FIG. 5 is a plot illustrating class assignment after first grouping.

The first grouping of neighboring bands, shown in FIG. 5, is performed exploiting the knowledge that the spacing between echo peaks, e.g., 41, 43 as shown in FIG. 4, must be less than $1/T_{min}$. Beginning with the class having the highest power level, frequency bins belonging to the desired class are identified. If the desired class is detected twice within a frequency interval of $1/T_{min}$ without encountering an intermediate bin of a higher class, then all intermediate bins are reassigned to the desired class, thus creating a wider band. This grouping is applied sequentially for successively lower classes. This first grouping fills in between peaks (e.g., 41, 43 shown in FIG. 4) of the echo ripple. The resulting power spectrum has wider bands 51, 53, and 55.

Figure 6:
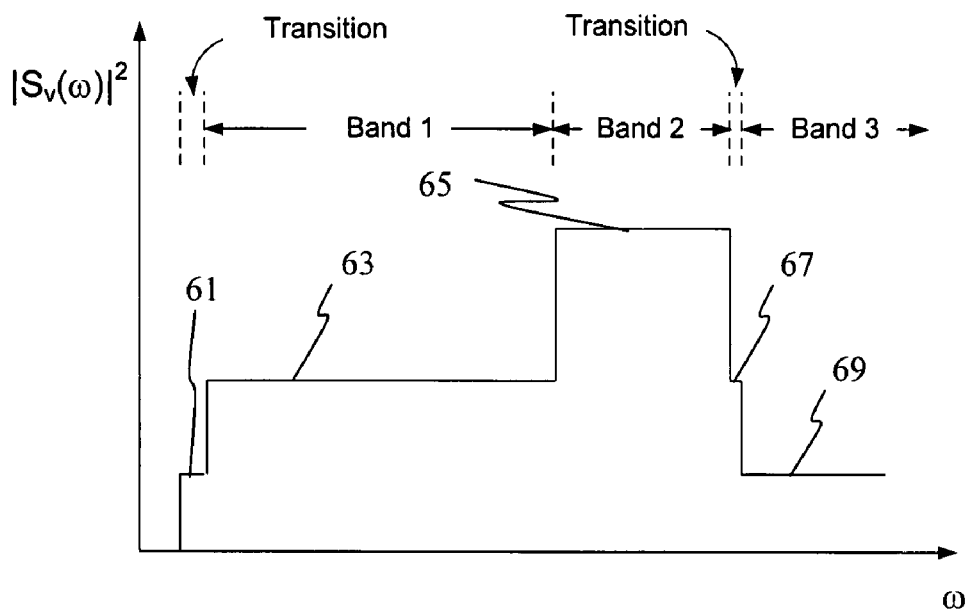
FIG. 6 is a plot illustrating class assignment after second grouping and band designation.

Bands are widened further using a second grouping, shown in FIG. 6, that merges bands of neighboring classes when the lower power class is surrounding by two bands of the next higher class. The lower power class is reassigned to the higher power class, once again increasing the width of the bands. For example, bands 51, 53 as shown in FIG. 5, which have a class indicated by quantization boundary 35, and the band therebetween that has a lower-power class indicated by quantization boundary 37, become wider band 63 shown in FIG. 6. Unlike the first grouping, no minimum frequency interval for merging bands is required. This second grouping prevents a band from being fragmented when its ripple peaks straddle a quantization boundary. The resulting power spectrum shown in FIG. 6 has wider bands 63, 65, and 69, and transition regions 61 and 67.

Once the quantization as illustrated in FIG. 3 and the two groupings as illustrated in FIGS. 4-6 are complete, the power spectrum will be partitioned into bands that roughly correspond to the carrier bandwidths and the transition bands between carriers. If carrier bandwidths become fragmented into narrow bands, the variations associated with echo ripples can be lost during the normalization process. In some cases, the transition band may be fragmented; however, this is not a serious concern because the transition information is not reliable for residual echo estimation. Fragmentation of carrier bandwidths is undesirable, but can be tolerated if it is modest. Within each band, the mean power per bin is computed by identifying bins with sufficient power (above a noise floor) and summing the power in each of those frequency bins, dividing by the number of bins. The inverse of the mean power becomes the spectral weighting of the desired filter response $|L(\omega)|^2$. When computing the spectral weighting, a minimum mean power level is defined, usually near the repeater noise level, so that idle portions of the spectrum are not amplified too greatly.

Next, an example will be described. In the following example, echo cancellation using a weighted spectrum is demonstrated. A Matlab simulink program models the repeater. Matlab code is used to compute the echo cancellation coefficients. The RF coupling in simulink has two taps at delays $[t_1\ t_2] = [131\ 135]$ whose coefficients are $[0.5\ 0.5 * \exp(-j\pi 4)]$. (Note that $[t_1\ t_2] = [131\ 135]$ within simulink corresponds to $[t_1\ t_2] = [234\ 238]$ within Matlab and within the autocorrelation figures shown below because of the additional delay of the repeater).

The input signal is a single EDGE carrier and a three-carrier Wideband Code Division Multiple Access (WCDMA) signal whose average power is 30 dB (gain term in simulink set to 0.03) below the EDGE carrier. A noise spectrum would replace the WCDMA signal in an actual operation. The bandwidth of the EDGE carrier is too narrow to use the correlation method for echo cancellation. However, it is shown below that weighting the spectrum allows the use of the correlation method.

Figure 7:
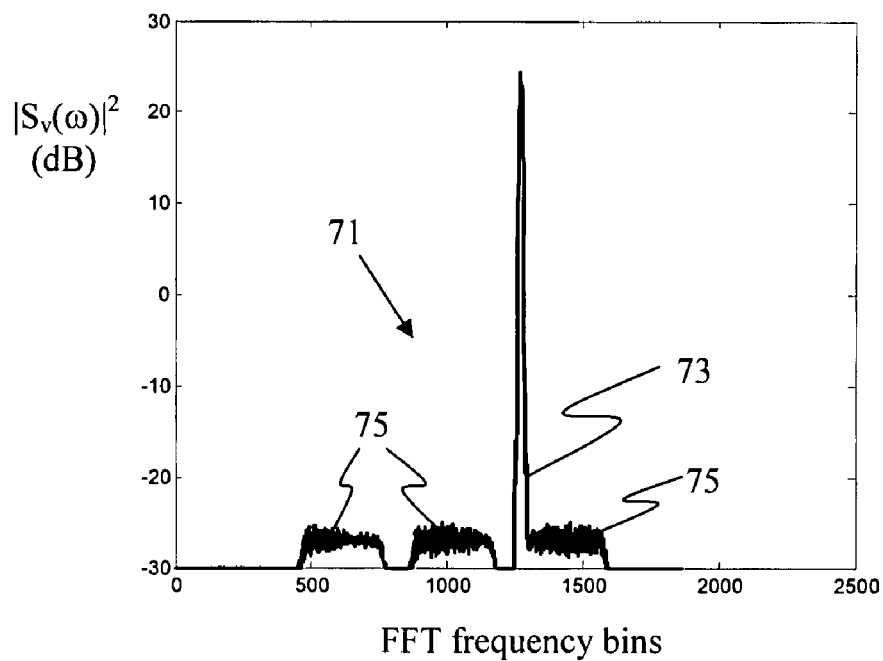
FIG. 7 is a plot illustrating repeater signal spectrum (dB) including −11 dB echo. The input is one-carrier EDGE, and 3-carrier Wideband Code Division Multiple Access (WCDMA) at a lower power.
Figure 12:
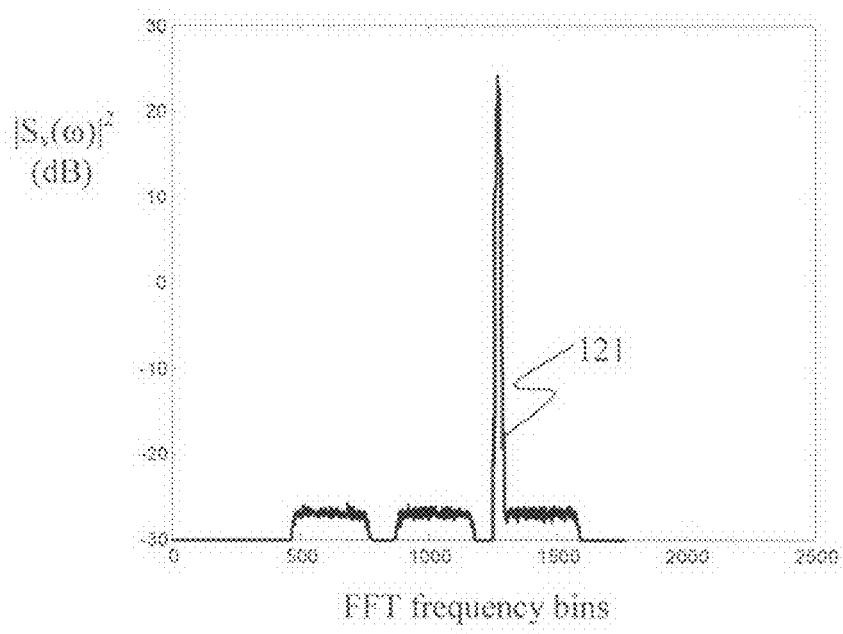
FIG. 12 is a plot illustrating repeater signal spectrum including −17 dB echo. The input is one-carrier EDGE, and 3-carrier WCDMA at a lower power.

The repeater spectrum 71 shown in FIG. 7 includes a residual echo. Within FIG. 7, the residual echo power is 11 dB below the input signal power. The input is one-carrier EDGE 73 and 3-carrier Wideband Code Division Multiple Access (WCDMA) 75 at lower power. Ripples on the WCDMA signal 75 are clearly visible. FIG. 12 shows the repeater spectrum 121 when the residual echo is −17 dB. Note that the ripples within the WCDMA spectrum are more pronounced when the residual echo is −11 dB (FIG. 7) as compared with −17 dB (FIG. 12). It is also apparent that the EDGE carrier bandwidth is too narrow in both FIGS. 7 and 12 to view the echo ripples.

Figure 8:
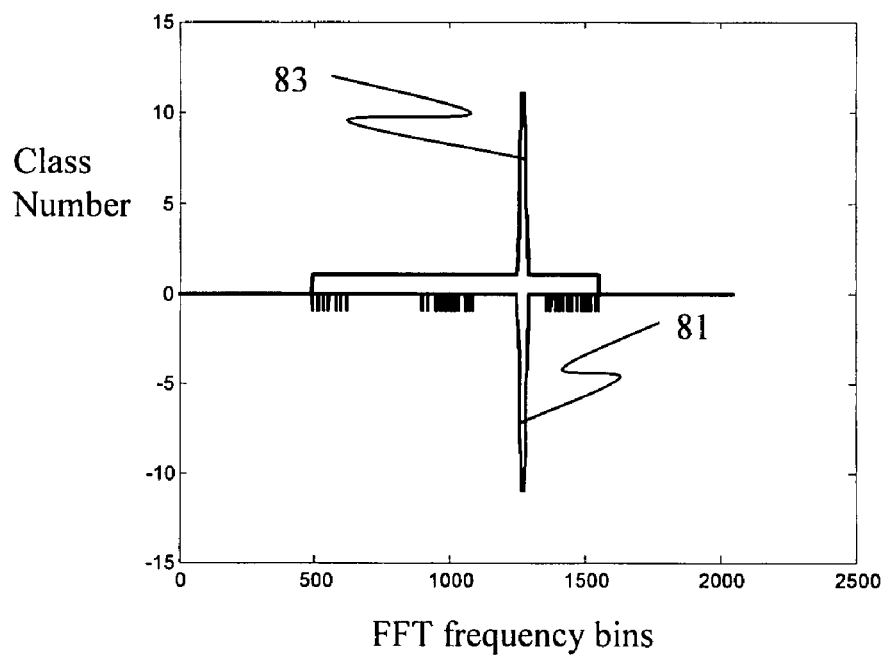
FIG. 8 is a plot illustrating class assignment and grouping for −11 dB residual echo.

The repeater spectrum 71 in FIG. 7 is used to partition the frequency axis into bands. The initial class assignment based on the logarithmic quantization is shown as trace 81 (inverted) within FIG. 8 (for the −11 dB residual echo case). The trace 81 is the original class assignment (inverted) after quantization. The WCDMA carriers are fragmented, alternating between class 0 and 1. The EDGE is assigned class 11. Several other classes appear in the transition between the EDGE and WCDMA signals. The class assignment after the two grouping is shown as trace 83 within FIG. 8. The WCDMA carriers are now assigned to class 1.

Figure 13:
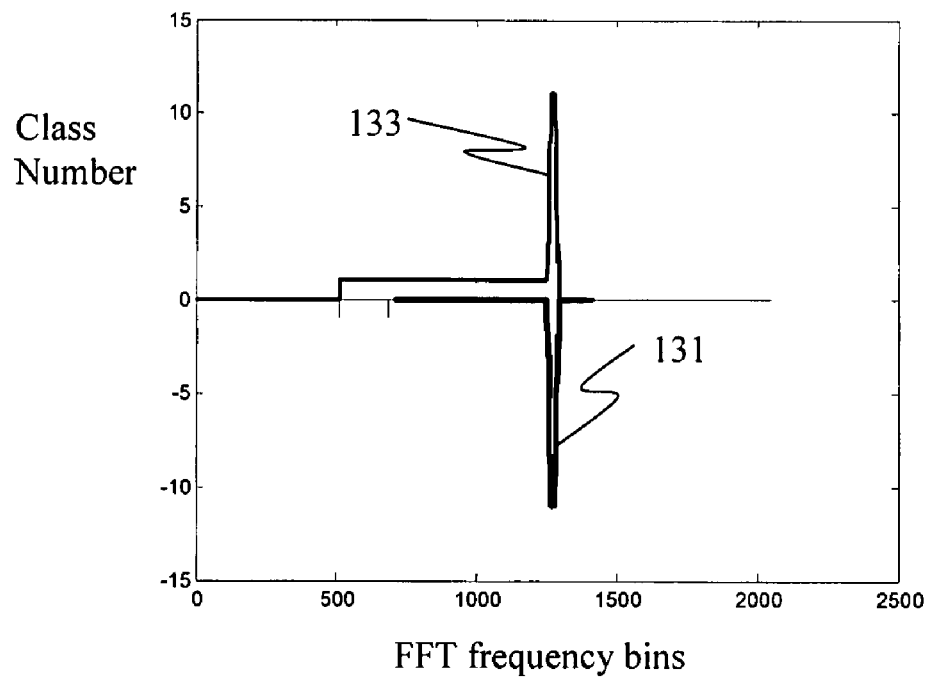
FIG. 13 is a plot illustrating class assignment and grouping for −17 dB residual echo.

The class assignment and grouping for the −17 dB residual echo case is shown in FIG. 13. The trace 131 is the original class assignment (inverted) after quantization. The trace 133 is the class assignment after grouping. The bands formed are slightly different than in the −11 dB residual echo case. In particular, the highest frequency WCDMA carrier band has been combined was the higher frequency bins with no power. This is not problematic because the bins with no power are not used in the calculation of the power normalization constant (see below).

Figure 9:
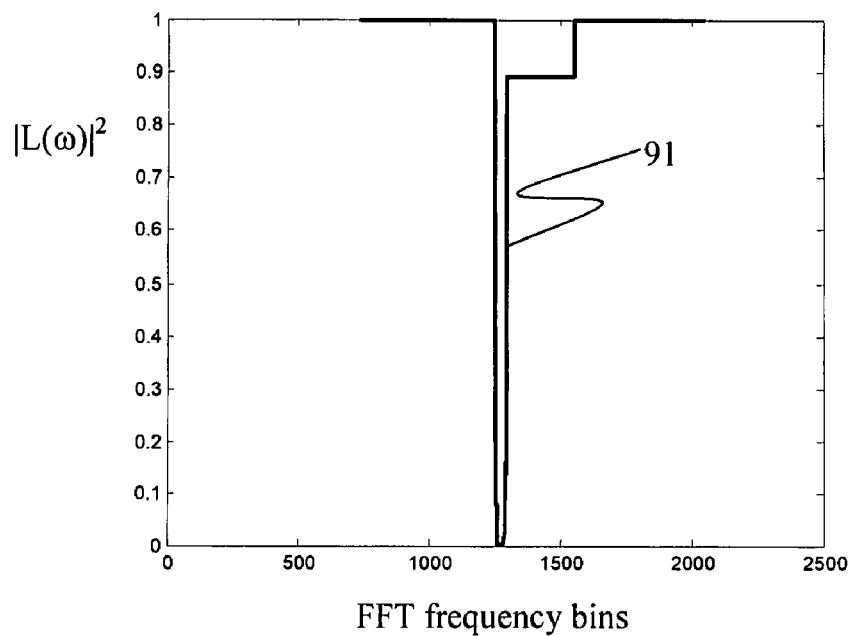
FIG. 9 is a plot illustrating the spectrum weighting function $|L(\omega)|^2$ for −11 dB echo.
Figure 14:
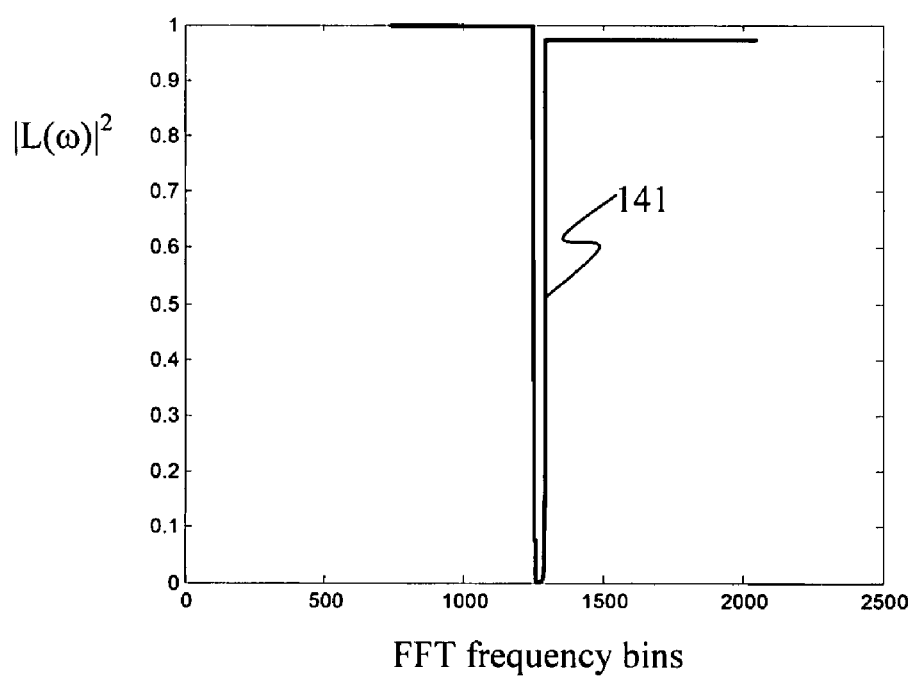
FIG. 14 is a plot illustrating spectrum weighting function $|L(\omega)|^2$ for −17 dB echo.

A continuous interval of a given class is treated as a band, which is normalized in terms power density, creating the spectral weighting $|L(\omega)|^2$. As mentioned earlier, bins with no power are not used in the calculation of the band's normalization constant. The weighting functions for the −11 dB and −17 dB residual echoes are shown in FIG. 9 as trace 91 and in FIG. 14 as trace 141, respectively. There are slight differences in the normalization of the highest frequency WCDMA carrier for the −11 and −17 dB cases (0.89 and 0.97, respectively). The −17 dB residual echo case is considered more accurate.

Figure 10:
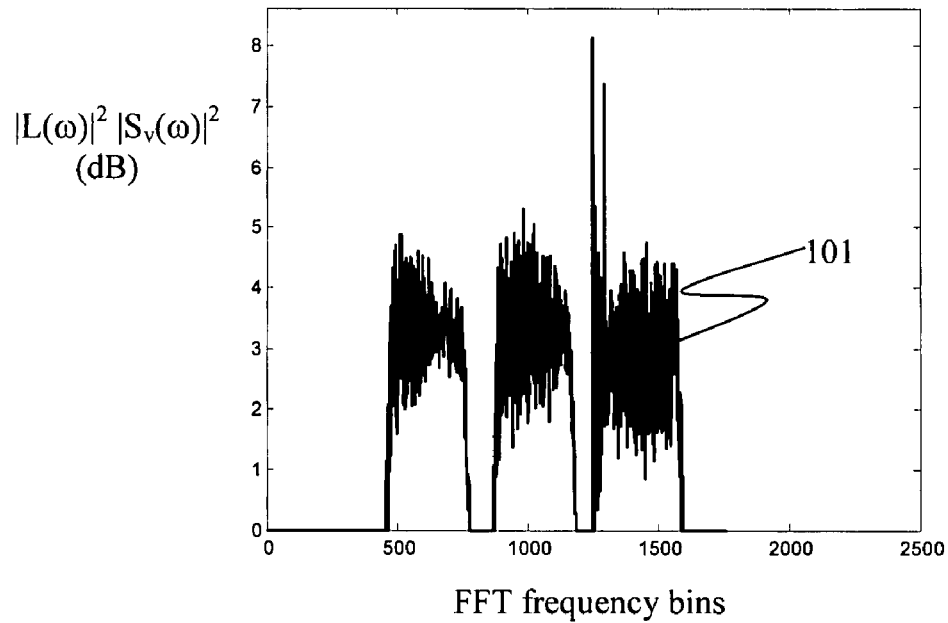
FIG. 10 is a plot illustrating weighted repeater signal spectrum (dB) including −11 dB echo.
Figure 15:
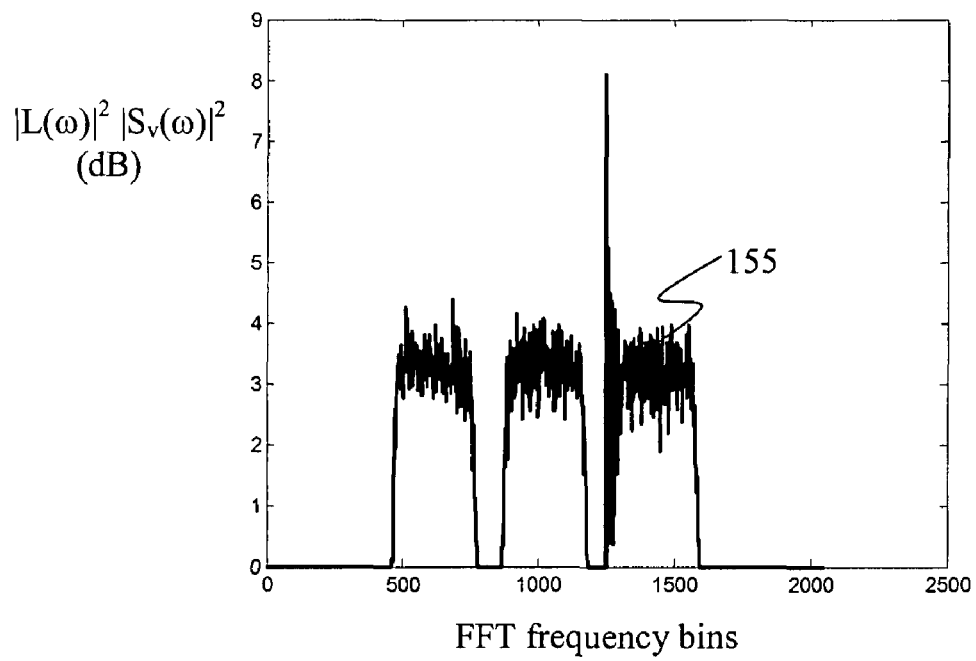
FIG. 15 is a plot illustrating weighted repeater signal spectrum (dB) including −17 dB echo.

The weighted power spectra, $|L(\omega)|^2 * |V(\omega)|^2$, are shown in FIG. 10 as trace 101 and in FIG. 15 as trace 155 for the −11 dB and −17 dB residual echo cases, respectively. The variation is the power density between EDGE and WCDMA carriers and is reduced significantly in both cases.

Figure 11:
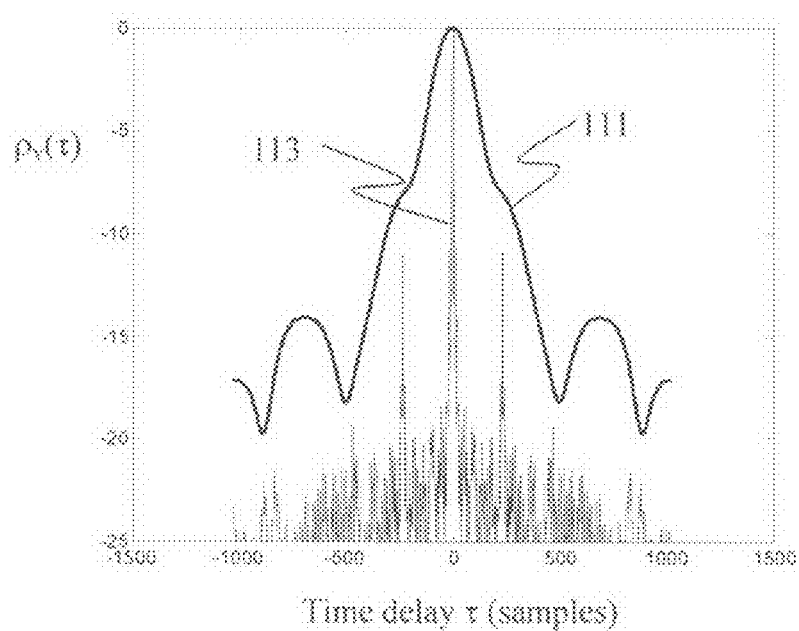
FIG. 11 is a plot illustrating autocorrelation (dB) of repeater signal including −11 dB echo.

The autocorrelation for the −11 dB residual echo is shown in FIG. 11. The traces 111 and 113 are computed from the original and weight spectra, respectively. More specifically, the trace 111 is the autocorrelation computed from the original power spectrum 71 in FIG. 7. The trace 113 is based on the weighted spectrum 101 in FIG. 10. The echo components at $[t_1\ t_2] = [234\ 238]$ are easy to identify in the trace 113. However, the echoes are masked in the trace 111 because the autocorrelation of the single channel EDGE carrier is too wide.

Figure 16:
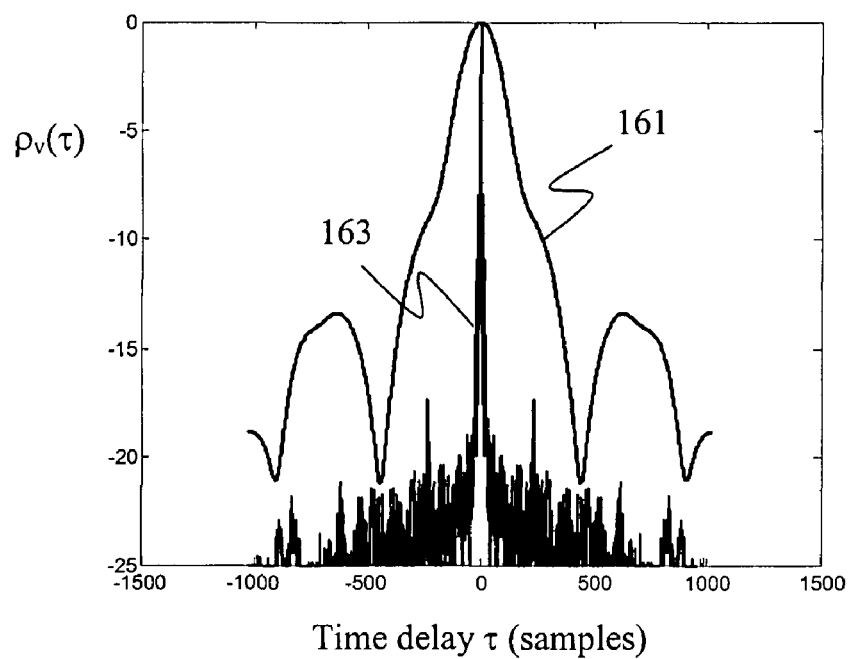
FIG. 16 is a plot illustrating autocorrelation (dB) of repeater signal including −17 dB echo.

The autocorrelation for the −17 dB residual echo is shown in FIG. 16. The traces 161 and 163 are computed from the original and weight spectra, respectively. It can be seen that the masking by the EDGE carrier with the original power spectrum is still significant despite the reduction in the echo power.

Advantageously, embodiments of the invention allow autocorrelation method to be applied to narrow bandwidth signals for echo cancellation. This is achieved by, for example, using a weighted power spectrum.

The present invention has been described in relation to a presently preferred embodiment, however, it will be appreciated by those skilled in the art that a variety of modifications, too numerous to describe, may be made while remaining within the scope of the present invention. Accordingly, the above detailed description should be viewed as illustrative only and not limiting in nature.

What is claimed is:

1. A wireless repeater, comprising:
an input antenna for receiving an input signal;
an output antenna for outputting an amplified signal;
an amplifier for amplifying the received input signal and providing the output amplified signal to the output antenna;
a filter for applying a weighting function to a power spectrum of a measured signal in the wireless repeater thereby obtaining a weighted power spectrum of the measured signal; and
an internal feedback path for adaptively canceling an echo between the output antenna and the input antenna by implementing an adaptive algorithm based on an autocorrelation of the input signal employing the weighted power spectrum of the measured signal,
wherein the filter reduces the width of the autocorrelation of the input signal.

2. A wireless repeater as set out in claim 1, wherein the input signal and the output amplified signal have the same frequency.

3. A wireless repeater as set out in claim 1, wherein the internal feedback path comprises a digital gain block, and wherein the measured signal is measured before the digital gain block.

4. A wireless repeater as set out in claim 1, wherein the internal feedback path comprises a portion of a digital IF stage.

5. A wireless repeater as set out in claim 4, wherein the digital IF stage comprises a digital signal processor implementing the adaptive algorithm for cancelling the echo.

6. A wireless repeater as set out in claim 1, wherein the weighting function whitens a power spectrum of the input signal plus noise.

7. A wireless repeater as set out in claim 1, wherein the weighting function preserves echo ripples in the power spectrum of the measured signal.

8. A wireless repeater as set out in claim 1, wherein the weighting function adjusts power of a carrier within the measured signal so that when multiple carriers are included, each carrier has on average the same power density, and when a single carrier is included, the power density of the single carrier is reduced to match an ambient noise of the repeater.

9. A method for echo cancellation in a wireless repeater, comprising:
measuring a signal in a signal path of the wireless repeater;
applying a spectral weighting function to a power spectrum of the measured signal to obtain a weighted power spectrum;
obtaining an autocorrelation of the signal in the signal path of the repeater based on the weighted power spectrum;
detecting an echo in the signal path based on the autocorrelation; and
adaptively cancelling the echo in the signal path based on the detected echo,
wherein the weighted power spectrum reduces the width of the autocorrelation.

10. A method as set out in claim 9, wherein applying the spectral weighting function comprises filtering the measured signal.

11. A method as set out in claim 9, wherein the signal in the signal path comprises a narrowband signal having an overlapping autocorrelation between the echo and measured signal prior to applying said spectral weighting function.

12. A method as set out in claim 11, wherein the narrowband signal comprises an Enhanced Data rates for GSM Evolution (EDGE) signal.

13. A method as set out in claim 9, further comprising:
obtaining the spectral weighting function based on an input spectrum without echo.

14. A method as set out in claim 13, further comprising:
estimating the input spectrum by fitting the power spectrum of the measured signal to a model based on the modulation format of the signal in the signal path.

15. A method as set out in claim 14, further comprising quantizing the power spectrum of the measured signal to a plurality of levels.

16. A method as set out in claim 15, wherein quantizing the power spectrum comprises logarithmic quantizing.

17. A method as set out in claim 16, wherein the power spectrum is configured as a function of a plurality of frequency bins, the method further comprising grouping bins in the power spectrum to form bands wider than said frequency bins.

18. A method as set out in claim 17, further comprising:
obtaining a mean power from said bands; and
calculating the spectral weighting function using an inverse of the mean power.

19. A method as set out in claim 9, wherein the spectral weighting function is based on an input signal and a noise signal spectra without effects of the echo.

20. A method as set out in claim 9, further comprising partitioning the power spectrum into disjoint bands by grouping frequency bins into contiguous bands based on a measured power density.

21. A method as set out in claim 20, further comprising normalizing a power of each band so that a power spectral density of each band equals a reference level.

22. A wireless communication system, comprising:
a base station; and an on-frequency repeater for extending the base station coverage, wherein the on-frequency repeater comprises:
an input antenna for receiving an input signal;
an output antenna for outputting an amplified signal;
an amplifier for amplifying the received input signal and providing the amplified output signal to the output antenna; and
an internal feedback path for adaptively cancelling an echo between the input antenna and the output antenna,
wherein the internal feedback path comprises:
means for measuring a signal in the feedback path;
means for obtaining a weighted power spectrum of the measured signal;
means for obtaining a signal autocorrelation in the feedback path based on the weighted power spectrum; and
means for adaptively cancelling the echo based on the obtained signal autocorrelation.

23. A wireless communication system of claim 22, wherein the means for obtaining the weighted power spectrum comprises a filter for reducing the width of the signal autocorrelation.

24. A wireless communication system of claim 22, wherein the means for obtaining the weighted power spectrum whitens the power spectrum.

* * * * *